(12) United States Patent
Berner

(10) Patent No.: US 10,904,462 B2
(45) Date of Patent: Jan. 26, 2021

(54) EVENT-BASED VISION SENSOR

(71) Applicant: Sony Advanced Visual Sensing AG, Zürich (CH)

(72) Inventor: Raphael Berner, Confignon (CH)

(73) Assignee: Sony Advanced Visual Sensing AG, Zürich (CH)

( * ) Notice: Subject to any disclaimer, the term of this patent is extended or adjusted under 35 U.S.C. 154(b) by 0 days.

(21) Appl. No.: 16/682,505

(22) Filed: Nov. 13, 2019

(65) Prior Publication Data

US 2020/0154065 A1 May 14, 2020

Related U.S. Application Data

(63) Continuation of application No. 16/078,443, filed as application No. PCT/IB2017/051129 on Feb. 27, 2017, now Pat. No. 10,498,977.

(30) Foreign Application Priority Data

Mar. 3, 2016 (CH) ........................................ 271/16

(51) Int. Cl.
 *H04N 5/351* (2011.01)
 *H04N 5/345* (2011.01)
 *H04N 5/3745* (2011.01)
 *H04N 5/378* (2011.01)

(52) U.S. Cl.
 CPC ............. *H04N 5/351* (2013.01); *H04N 5/345* (2013.01); *H04N 5/378* (2013.01); *H04N 5/37452* (2013.01)

(58) Field of Classification Search
 CPC ........ H04N 5/351; H04N 5/345; H04N 5/378; H04N 5/37452
 See application file for complete search history.

(56) References Cited

U.S. PATENT DOCUMENTS 6,624,849 B1 9/2003 Nomura
7,728,269 B2 6/2010 Lichtsteiner et al.
(Continued)

FOREIGN PATENT DOCUMENTS

EP 2 538 665 12/2012

OTHER PUBLICATIONS

Fu, Z., et al., "A 1.2mW CMOS temporal-difference image sensor for sensor networks," Circuits and Systems IEEE, 1064-1067 (2008).
(Continued)

*Primary Examiner* — Mekonnen D Dagnew
(74) *Attorney, Agent, or Firm* — Houstonhogle LLP

(57) ABSTRACT

According to the present invention there is provided a vision sensor comprising, an array of pixels (101) comprising rows and columns of pixels, wherein each pixel has an address assigned thereto which represents the position of the pixel in the array, wherein each pixel in the array of pixels comprises a photodiode (103) which can receive light, and which can output current having an amplitude proportional to the intensity of the received light; a photoreceptor circuit (104) which is electronically connected to the photodiode, and which is configured to convert current which it receives from the photodiode into a voltage; a first storage capacitor (105), and at least a first switch which (106) is positioned between the first storage capacitor and an output of the photoreceptor circuit, wherein the first switch can be selectively closed to electronically connect the output of the photoreceptor circuit to the first storage capacitor, or selectively opened to electronically disconnect the output of the photoreceptor circuit from the first storage capacitor; and a circuit (102, 201) which is configured so that it can be selectively electronically connected to a pixel in the array, and to determine if the difference between the voltage output from the photoreceptor circuit and the voltage across the first
(Continued)

(a)

(b)

storage capacitor is greater than a predefined threshold voltage, and to output the address of the pixel to a receiver only if the difference between the voltage output from the photoreceptor circuit and the voltage across the first storage capacitor is greater than a predefined threshold voltage. There is further provided a corresponding method of vision sensing using the vision sensor.

14 Claims, 11 Drawing Sheets

(56) References Cited

U.S. PATENT DOCUMENTS

| | | | | |
|---|---|---|---|---|
| 9,986,179 | B2* | 5/2018 | Govil | H04N 5/3456 |
| 10,237,481 | B2* | 3/2019 | Newcombe | H04N 5/23245 |
| 2014/0326854 | A1* | 11/2014 | Delbruck | H04N 5/378 |
| | | | | 250/204 |
| 2016/0094800 | A1* | 3/2016 | Gousev | G06K 9/00986 |
| | | | | 348/310 |
| 2017/0064211 | A1* | 3/2017 | Omid-Zohoor | H04N 5/23241 |

OTHER PUBLICATIONS

International Search Report and Written Opinion of the International Searching Authority, dated May 9, 2017, from International Application No. PCT/IB2017/051129, filed on Feb. 27, 2017. 20 pages.

Mallik, U., et al., "Temporal change threshold detection imager," IEEE International Solid-State Circuits Conference, Session 19 (2005).

* cited by examiner

EVENT-BASED VISION SENSOR

RELATED APPLICATIONS

This application is a Continuation of U.S. patent application Ser. No. 16/078,443, filed on Aug. 21, 2018, which is a § 371 National Phase Application of International Application No. PCT/IB2017/051129, filed on Feb. 27, 2017, now International Publication No. WO 2017/149433, published on Sep. 8, 2017, which International Application claims priority to Swiss Application 0271/16, filed on Mar. 3, 2016, all of which are incorporated herein by reference in their entirety.

FIELD OF THE INVENTION

The present invention concerns a vision sensor for machine vision applications. The sensor reacts to changes in light intensity. In the vision sensor the addresses of those pixels where a light intensity change has been detected are output.

DESCRIPTION OF RELATED ART

Today machine vision is mostly based on conventional cameras and their associated frame-based image sensors. While for some machine vision tasks like objection recognition these conventional cameras are well suited, for other tasks like tracking or position and motion estimation the conventional image sensors have drawbacks: these sensors produce a significant amount of redundant, unnecessary data that has to be captured, communicated and processed. This high throughput of data slows down the reaction time, the temporal resolution and increases the power consumption, size and prize of a machine vision system. In addition to these problems, most image sensors suffer from a limited dynamic range, poor low-light performance and motion blur. These drawbacks limit the capabilities of the machine vision systems and arise from the fact that conventional image sensors have been developed to produce beautiful images and movies and not to generate smart data.

Using conventional cameras, to estimate the position and orientation of a mobile system and to infer a 3D map of the world surrounding it, two sequential images which are partially overlapping but taken at different times and from different perspectives are compared. To infer the motion that occurred between the two frames, characteristic visual landmarks (keypoints or other visual features) have to be matched across the two images. Finding these pairs of points that correspond to each other in both images is known as solving the "correspondence problem" and it requires a significant amount of processing power. To detect these landmarks, every pixel in an image is searched for interesting features (corners, blobs, edges, etc.) and then the pixels in the direct surrounding of a feature are described using so-called feature descriptors which allow matching the features between the frames and thereby establishing pairs of corresponding points.

A first prior art sensor design, such as that described in U.S. Pat. No. 7,728,269 B2, is a self-timed pixel circuit that asynchronously detects temporal contrast changes. It uses a capacitive amplifier and two comparators to continuously monitor the pixel illumination. When it detects an illumination change, the pixel notifies peripheral circuits. This first prior art sensor also circumvents the shortcomings mentioned above, but the pixel circuits used are complex and therefore require significant die area, which results in large sensor chips that require larger optics. In this first prior art sensor the pixel itself decides if the light intensity has changed, and the pixel initiates the communication of the event. In this first prior art sensor, each pixel contains two comparators to detect changes and the necessary circuits to initiate the communication, which amounts to complex circuitry.

Additionally the prior art sensor works completely asynchronous, which makes interfacing standard processing hardware like microprocessors more cumbersome.

A second prior art sensor design, such as that described in the publication "Temporal change threshold detection imager", by Mallik et al., published in Digest of Technical Papers, Solid-State Circuits Conference, 2005, DOI 10.1109/ISSCC.2005.1494019, is a frame-based temporal change detection image sensor that uses a linear pixel front-end and two floating capacitors per pixel to detect changes from one frame to the next frame. The sensor resets all pixels unconditionally of the change detection output, meaning that movements slower than the frame rate cannot be observed. The second prior art sensor measures temporal differences for a fixed time difference, which equals measuring the temporal derivative of the light intensity. For the second prior art sensor, scene changes that happen slower than a given threshold (defined by the frame rate) are not seen. This is illustrated with the following equations. In each pixel, the light intensity Int is read at discretized points in time, and the relation between sampled voltage and intensity is linear:

$$Vaps(tn)=k1+k2*Int(tn)=k1+k3*Iphoto(tn), \qquad (1)$$

where k1, k2 and k3 are constants, tn denotes the time of the n-th frame, Vaps(t) the pixel output voltage at time t and Iphoto(t) the current generated in the photosensor of the corresponding pixel at time t. The second prior art sensor computes the difference between two successive frames:

$$Vdiff = Vaps(tn) - Vaps(t(n-1)) = k3 * (Iphoto(tn) - Iphoto(t(n-1))) \qquad (2)$$

$$Vdiff = k3 * \frac{dIphoto}{dt} * t_{frame}, \qquad (3)$$

Wherein $$\frac{dIphoto}{dt}$$

is the derivative of the photocurrent, which is proportional to the derivative of the light intensity, and tframe is the inverse of the frame rate, which is usually constant. So, Vdiff being bigger than a given threshold means that the derivative of the light intensity must be bigger than a given threshold. This means slower changes in the scene are not recognized, because Vdiff is reset after each frame.

An additional disadvantage of the second prior art sensor is that it is a linear sensor and has thus limited dynamic range.

Publication "A 1.2 mW CMOS temporal-difference image sensor for sensor networks" from Zhengming fu et al (Circuits and Systems, 2008, IEEE International Symposium On, IEEE, Piscataway, N.J.) discloses an active pixel image sensor (APS), Mototrigger, which targets low-power image sensing for sensor networks. The image sensor computes the temporal-difference between two continuous light-intensity frames and communicates them in address-event format. The image sensor is capable of computing 30 temporal-difference frame/s and consumes 1.2 mW with a 3V power supply. Light-intensity images are also available as an output at a speed of 60 frame/s.

It is an aim of the present invention to obviate or mitigate at least some of the disadvantages associated with the prior art solutions.

BRIEF SUMMARY OF THE INVENTION

According to the invention, these aims are achieved by means of a vision sensor comprising,
an array of pixels comprising rows and columns of pixels, wherein each pixel has an address assigned thereto which represents the position of the pixel in the array,
wherein each pixel in the array of pixels comprises, a photodiode which can receive light, and which can output current having an amplitude proportional to the intensity of the received light; a photoreceptor circuit which is electrically connected to the photodiode, and which is configured to convert current which it receives from the photodiode into a voltage; a first storage capacitor, and at least a first switch which is positioned between the first storage capacitor and an output of the photoreceptor circuit, wherein the first switch can be selectively closed to electronically connect the output of the photoreceptor circuit to the first storage capacitor, or selectively opened to electronically disconnect the output of the photoreceptor circuit from the first storage capacitor;
and a circuit which is configured so that it can be selectively electronically connected to a pixel in the array, and to determine if the difference between the voltage output from the photoreceptor circuit and the voltage across the first storage capacitor is greater than a predefined threshold voltage, and to output the address of the pixel to a receiver only if the difference between the voltage output from the photoreceptor circuit and the voltage across the first storage capacitor is greater than a predefined threshold voltage.

The circuit may be further configured to, either output to the receiver the voltage output from the photoreceptor circuit, or, output to the receiver a digital value which is representative of the voltage output from the photoreceptor circuit.

The circuit may be further configured to close the first switch so that the output of the photoreceptor circuit is electronically connected to the first storage capacitor only if the difference between the voltage output from the photoreceptor circuit and the voltage across the first storage capacitor is greater than the predefined threshold voltage.

Said circuit may further comprise,
a column circuit which is configured to determine if, in a pixel, the difference between the voltage output from the photoreceptor circuit and the voltage across the first storage capacitor of that pixel, is greater than the predefined threshold voltage;
a row selection circuit operable to selectively connect one or more rows of pixels in the pixel array to the column circuit; and
a read-out circuit for transmitting the address of a pixel to the receiver if the difference between the voltage output from the photoreceptor circuit and the voltage across the first storage capacitor is greater than the predefined threshold voltage.

The vision sensor may further comprise a plurality of column circuits, the number of column circuits corresponding to the number of columns of pixels in the array of pixels, and wherein the row selection circuit is configured so that it can selectively connect all of the pixels in a row to a respective column circuit so that all of the pixels in the row are simultaneously connected to said plurality of column circuits, so that for each of the pixels in the row, the difference between the voltage output from the photoreceptor circuit and the voltage across the first storage capacitor of each of those pixels, can be simultaneously determined.

The read-out circuit may be configured to consecutively transmit the addresses of the pixels in the row in which it was determined that difference between the voltage output from the photoreceptor circuit and the voltage across the first storage capacitor was greater than the predefined threshold voltage, to the receiver.

Each row of pixels in the array may have a respective row address assigned to it, and wherein an output of row-selection circuit is connected to the read-out circuit, wherein the row-selection circuit is configured to output to the read out circuit, the row address of the row if is determined that in at least one pixel of that row, the difference between the voltage output from the photoreceptor circuit and the voltage across the first storage capacitor of said pixel is greater than a predefined threshold voltage, so that the read out circuit can transmit the address of the pixel to the receiver.

Each column of pixels in the array may have a respective row column address assigned to it, and the column circuit may be further configured to output to the read out circuit the column address of a column in the array, if is determined that in at least one pixel in that column the voltage across the first storage capacitor of said pixel is greater than a predefined threshold voltage, so that the read out circuit can transmit the address of the pixel to the receiver.

The vision sensor may comprise a plurality of column circuits, the number of column circuits corresponding to the number of columns of pixels in the array of pixels, and each column of pixels in the array may have a respective column address assigned to it, and the read out circuit may be further configured to identify the column address of a column in the array, if the column circuit corresponding to that column of pixels, determines that in at least one pixel in that column the voltage across the first storage capacitor of said pixel is greater than a predefined threshold voltage, so that the read out circuit can transmit the address of the pixel to the receiver.

The column circuit may further comprise
means for determining the difference between the voltage across said capacitor of a pixel and the voltage output from the photoreceptor circuit of the pixel, and outputting a signal which is representative of the difference; and
a first comparator and second comparator, each of which is connected to said means for determining the difference, so that the first and second comparators each receive the signal which is representative of the difference;
wherein the first comparator is configured to compare the signal it receives to a first predefined threshold value and to close the first switch if the signal is larger than the first threshold, and the second comparator is configured to compare the signal it receives to a second predefined threshold value and to close the first switch if the signal is larger than the first threshold.

The vision sensor may further comprise an OR gate, and respective outputs of the first and second comparators are connected to respective inputs of the OR gate; and wherein an output of the OR gate is connected an input to a Flip-Flop, and an output of the Flip-Flop is connected to the read-out circuit, and it is also connected to an input of an AND gate, and wherein a controller which can send clocking signals, is connected to another input of said AND gate.

The vision sensor may further comprise a first and second Flip Flop, an output of the first comparator is connected to an input of the first Flip Flop, and an output of the second comparator is connected to an input of the second Flip Flop, and wherein outputs of the first and second Flip Flops are connected to respective inputs of an OR gate, and the output of OR gate is connected to the read-out circuit and to an input of an AND gate and wherein a controller which can send clocking signals is connected to another input of said AND gate.

The vision sensor may comprise a read-out circuit in the form of a token-readout circuit.

The vision sensor may further comprise a finite state machine for controlling the row select circuit, column circuit(s) and the read-out circuit.

The read-out circuit may further comprise a first-in-first-out memory buffer, for storing the addresses of pixels in a row in which it was determined that difference between the voltage output from the photoreceptor circuit and the voltage across the first storage capacitor was greater than the predefined threshold voltage, before those addresses are output to the receiver.

Each pixel may comprise a second switch positioned between the first storage capacitor and output of the photoreceptor circuit, wherein the second switch is operably connected to the row selection circuit such that the row selection circuit can selectively close the second switch when the pixel is connected to the column circuit and open the second switch when the pixel is disconnected from the column circuit.

Each pixel may further comprise a buffer in the form of a source follower transistor.

Each pixel may further comprise at least one further switch between the first capacitor and a gate of the source follower transistor, and a further switch is provided between the output of the photoreceptor circuit and the gate of the source follower transistor.

Each pixel may further comprise a buffer in the form of a source follower transistor, wherein two switches are provided in series between the first capacitor and a gate of the source follower transistor; wherein at least one of the switches is operably connected to the row selection circuit such that the row selection circuit can selectively close said switch when the pixel is connected to the column circuit and open the switch when the pixel is disconnected from the column circuit.

Each pixel may further comprise a further switch which is connected to a reference voltage, and said further switch is arranged so that when closed it connects the gate of the source follower transistor to said reference voltage.

Each pixel may further comprise a second storage capacitor, and a switch which is positioned between the second storage capacitor and an output of the photoreceptor, wherein the switch can be selectively closed to electronically connect the output of the photoreceptor circuit to the second storage capacitor, or selectively opened to electronically disconnect the output of the photoreceptor circuit from the second storage capacitor. Wherein said switch which is positioned between the second storage capacitor and an output of the photoreceptor is operably connected to the row selection circuit such that the row selection circuit can selectively close said switch when the pixel is connected to the column circuit and open the switch when the pixel is disconnected from the column circuit.

Each pixel may further comprise a buffer in the form of a source follower transistor, and wherein at least one further switch is provided between the first capacitor and a gate of the source follower transistor, and at least one further switch is provided between the second storage capacitor and the gate of the source follower transistor.

The photoreceptor circuit may comprise an NMOS transistor, wherein the source of the NMOS transistor is connected to an output of the photodiode and the drain of the NMOS transistor is connected to a first voltage source, and the gate of the NMOS transistor is connected to a second voltage source.

The photoreceptor circuit may comprise a PMOS transistor, wherein the drain and the gate of the PMOS transistor are connected to an output of the photodiode and the source of the PMOS transistor is connected to a voltage source.

The photoreceptor circuit may comprise an inverting amplifier and a feedback element, wherein the feedback element is configured to have a logarithmic current-to-voltage relation.

The amplifier may comprise a first transistor and a second transistor, wherein the source of the first transistor is grounded, the gate of the first transistor is connected to an output of the photodiode, and the drain of the first transistor is connected to drain of the second transistor, and wherein the drain of the second transistor is connected to the drain of the first transistor, the gate of the second transistor is connected to a first voltage source, and the source of the second transistor is connected to a second voltage source.

The photoreceptor circuit may comprise a first NMOS transistor, wherein the source of the first NMOS transistor is connected to an output of the photodiode and the drain of the first NMOS transistor is connected to a voltage source, and the gate of the first NMOS transistor is connected to an amplifier.

The photoreceptor circuit may comprise comprises a second NMOS transistor which is connected between the photodiode and first NMOS transistor, wherein the source of the second NMOS transistor is connected to an output of the photodiode and the drain of the second NMOS transistor is connected to the source of the first NMOS transistor, and the gate of the second NMOS transistor is connected to the source of the first NMOS transistor, and the gate of the first NMOS transistor is connected to an amplifier.

The photoreceptor circuit may comprise a PMOS transistor, wherein the drain of the PMOS transistor is connected to an output of the photodiode and the source of the PMOS transistor is connected to an amplifier, and the gate of the PMOS transistor is connected to a voltage source. Wherein the amplifier further comprises a cascade transistor, and wherein the gate of the cascade transistor is connected to a voltage source.

The electronical connections in the circuit may comprise one or multiple PMOS transistor or one or multiple NMOS transistor or a combination of one or multiple PMOS transistors and one or multiple PMOS transistor configured as a transmission gate.

The electronical connections in the circuit may further comprise one or multiple voltage buffer circuits.

This invention proposes a method of vision sensing using a vision sensor such as described in this invention, the method comprising the steps of
(a) selectively electronically connecting said circuit to a pixel in the array,
(b) determining if the difference between the voltage output from the photoreceptor circuit and the voltage across the first storage capacitor in the pixel is greater than a predefined threshold voltage; and
(c) outputting the address of the pixel to a receiver, only if the difference between the voltage output from the photoreceptor circuit and the voltage across the first storage capacitor is greater than a predefined threshold voltage.

The method may further comprise the step of closing the first switch so that the output of the photoreceptor circuit is electronically connected to the first storage capacitor only if the difference between the voltage output from the photoreceptor circuit and the voltage across the first storage capacitor is greater than the predefined threshold voltage.

The method may further comprise the step of connecting all of the pixels in a row to a respective column circuit so that all of the pixels in the row are simultaneously connected to said plurality of column circuits, and simultaneously determining for each pixel in the row, the difference between the voltage output from the photoreceptor circuit and the voltage across the first storage capacitor of the pixel.

The method may further comprise the step of consecutively transmitting the addresses of the pixels in the row in which it was determined that difference between the voltage output from the photoreceptor circuit and the voltage across the first storage capacitor was greater than the predefined threshold voltage, to the receiver.

The method may further comprise selecting only some of the pixels in the array, wherein the selected pixels define a region of interest, and performing steps (a)-(c) only on the selected pixels.

The method may further comprise the steps of determining said difference between the voltage output from the photoreceptor circuit and the voltage across the first storage capacitor in a pixel; and amplifying the determined difference.

Step (c) of the method may further comprise outputting to the receiver, either the voltage output from the photoreceptor circuit, or, a digital value which is representative of the voltage output from the photoreceptor circuit.

The vision sensor of the present invention overcomes the limitations of highly redundant output data, low temporal resolution, high power consumption, motion blur and low dynamic range. It is thus well suited especially for solar- or battery powered compressive sensing or for mobile machine vision applications where the position of the system has to be estimated and where processing power is limited due to limited battery capacity.

The vision sensor of the present invention pre-processes the visual information locally and instead of generating beautiful images, it produces smart data. While conventional image sensors capture a movie as a series of still images, the proposed sensor detects and only transmits the pixel coordinates of pixels that experienced changes in illuminance: this means that it encodes the visual information much more efficiently than conventional cameras. Data processing therefore uses less resources, requires less power and may be executed faster which results in a better system-level performance. The high temporal resolution allows continuously tracking the visual features and thereby overcoming the correspondence problem. Thanks to its architecture this sensor can also have a high dynamic range and good low-light performance.

Accordingly, compared to prior art, the vision sensor of the present invention has multiple advantages including: It efficiently encodes visual input; It allows to externally control pixel and thus sensor timing; It allows to control the sensor time resolution and thus the rate at which a pixel can output information; It reduces pixel size; and It reduces jitter in the readout path.

BRIEF DESCRIPTION OF THE DRAWINGS

The invention will be better understood with the aid of the description of an embodiment given by way of example and illustrated by the figures, in which:

FIG. 4 shows a pixel implementation for a vision sensor such as shown in FIG. 2a or FIG. 3a.

FIG. 5 shows a pixel implementation with global shutter for a vision sensor such as shown in FIG. 2a or FIG. 3a.

DETAILED DESCRIPTION OF POSSIBLE EMBODIMENTS OF THE INVENTION

Figure 1:
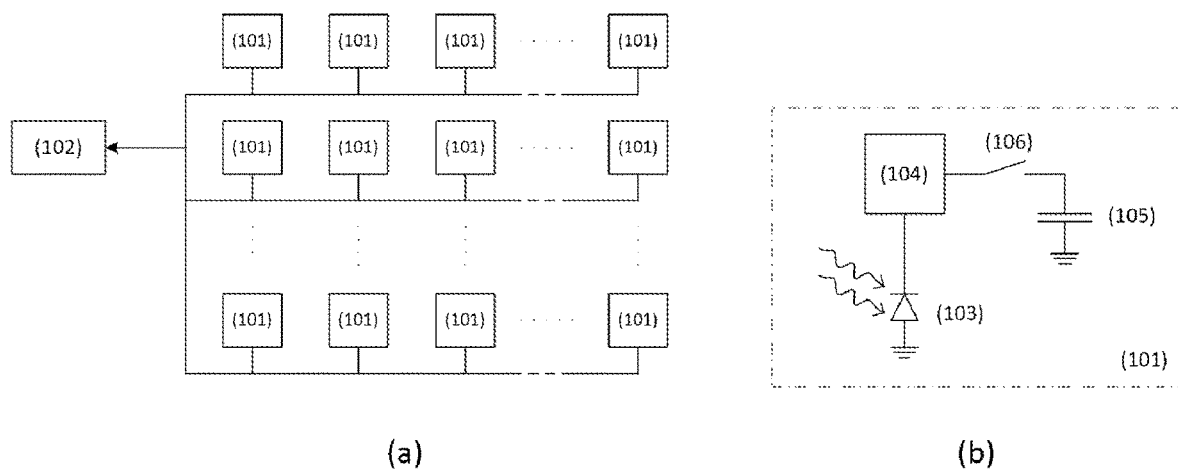
FIG. 1 shows an embodiment of the proposed vision sensor.

An embodiment of the proposed sensor is illustrated in FIG. 1a; the vision sensor comprises: an array of pixels comprising rows and columns of pixels 101, wherein each pixel has an address assigned thereto which represents the position of the pixel in the array, wherein each pixel (illustrated in FIG. 1b) in the array of pixels comprises, a photodiode 103 which can receive light, and which can output current having an amplitude proportional to the intensity of the received light;

a photoreceptor circuit 104 which is electronically connected to the photodiode, and which converts current which it receives from the photodiode into a voltage;

a first storage capacitor 105, and at least a first switch 106 which is positioned between the first storage capacitor and an output of the photoreceptor circuit.

The vision sensor further comprises at least one circuit 102 which is configured so that it can be selectively electronically connected to a pixel in the array, and to determine if the difference between the voltage output from the photoreceptor circuit (Vpr) and the voltage across the first storage capacitor (Vpr_last) is greater than a predefined threshold voltage, and to output the address of the pixel to a receiver only if the difference between Vpr and Vpr_last is greater than a predefined threshold voltage.

In the following description, the term 'event' shall mean that the light intensity falling on a pixel has changed by an amount greater than or equal to a predefined threshold amount. To transmit an event, the address of the corresponding pixel is transmitted. This is then called an addressed event.

The vision sensor may output an image if the Vpr voltages are converted to a digital value using an analog-to-digital converter (ADC) and then output to a receiver.

There are two options:

(1) a first option the digital values may be read out for all pixels, which would be like a conventional image sensor. Thus the proposed sensor would have the option to run in change detection mode or in image sensor mode.

(2) the second option is to convert only the Vpr values of those pixels where an event has happened, and then transmit these values along with the address of the pixels. This would mean the sensor runs in video camera mode with on-sensor video compression.

The vision sensor may comprise calibration circuits to improve image quality. One option of a calibration method is to subtract a reference frame.

Figure 2:
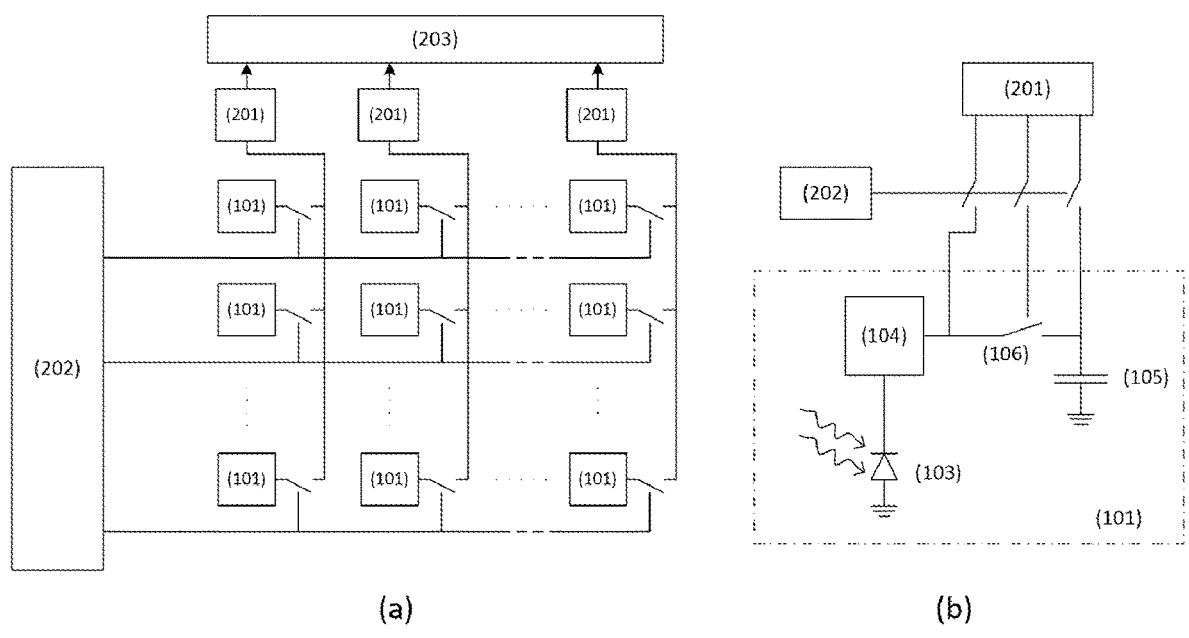
FIG. 2 shows an alternative embodiment of the proposed vision sensor.

An alternative embodiment of the vision sensor according to the present invention is illustrated in FIG. 2a. The vision sensor of FIG. 2a comprises an array of pixels organized in row and columns, where each pixel 101 has a unique address that encodes the position of the pixel in the array, wherein each pixel 101, illustrated in FIG. 2b, in the array of pixels comprises,
a photodiode which can receive light, and which can output current having an amplitude proportional to the intensity of the received light;
a photoreceptor circuit which is electronically connected to the photodiode, and which converts current which it receives from the photodiode into a voltage;
a first storage capacitor,
and at least a first switch which is positioned between the first storage capacitor and an output of the photoreceptor circuit.

The vision sensor of FIG. 2a further comprises a circuit 201 that is repeated for each column of pixels (this circuit shall be called column circuit) and shared between all pixels in one column. This column circuit can be selectively connected to a pixel in the corresponding column, and it is configured to be able to detect if the difference between Vpr and Vpr_last exceeds a predefined threshold (which means an event has happened in the currently selected pixel). The column circuit may also be able to operate the first switch 106 between the photoreceptor output and the storage capacitor. Optionally the column circuit can contain an analog-to-digital converter (ADC) to convert Vpr to a digital number.

The vision sensor of FIG. 2a further comprises a circuit for selecting one or multiple rows 202, called row selection circuit, where selection means selectively connecting the pixels in this row to the corresponding column circuit.

The vision sensor of FIG. 2a further comprises a circuit 203 for transmitting the addresses of those pixels where the difference between Vpr and Vpr_last exceeds a predefined threshold (and optionally the digital number representing Vpr) to some kind of receiver which can be external to the sensor chip. This circuit for transmitting data shall be called data readout circuit.

Further Embodiment

Figure 3:
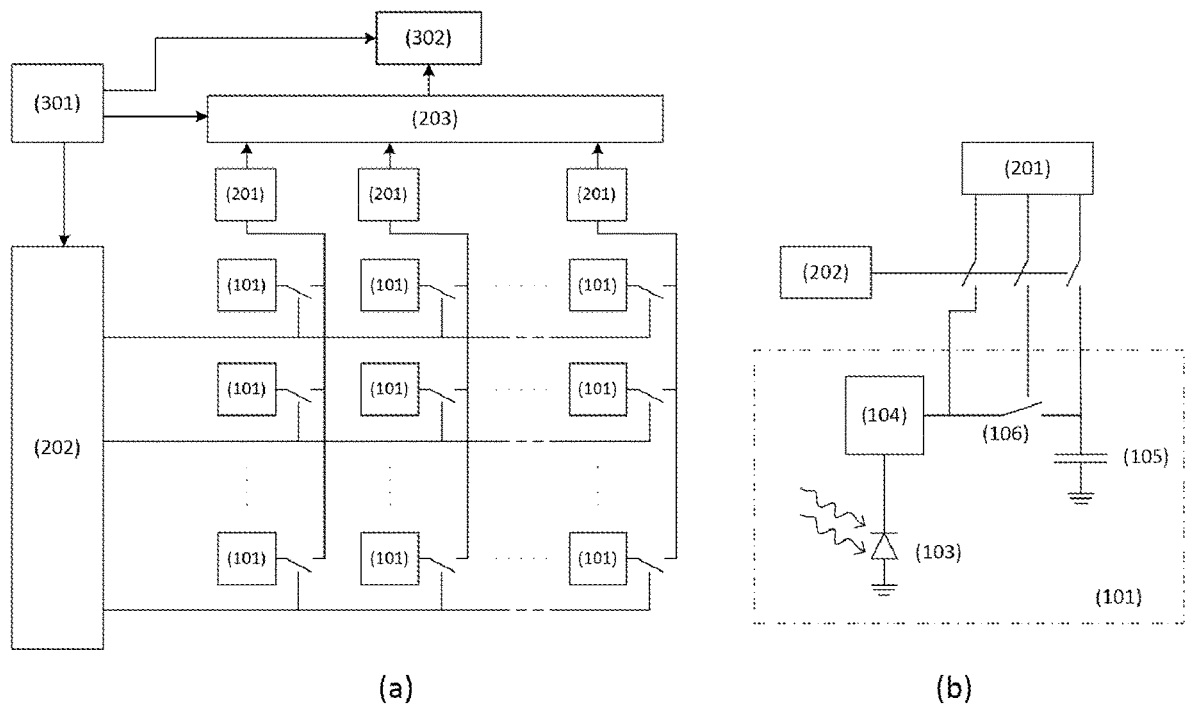
FIG. 3 shows a further embodiment of the proposed vision sensor.

A further embodiment of a vision sensor according to the present invention is illustrated in FIG. 3a. The vision sensor of FIG. 3a comprises, an array of pixels organized in row and columns, where each pixel 101 has a unique address that encodes the position of the pixel in the array, wherein each pixel 101, illustrated in FIG. 3b, in the array of pixels comprises,
a photodiode 103 which can receive light, and which can output current having an amplitude proportional to the intensity of the received light;
a photoreceptor circuit 104 which is electronically connected to the photodiode, and which converts current which it receives from the photodiode into a voltage;
a first storage capacitor 105,
and at least a first switch 106 which is positioned between the first storage capacitor and an output of the photoreceptor circuit.

The vision sensor of FIG. 3a further comprises a circuit 201 that is repeated for each column of pixels (this circuit shall be called column circuit) and shared between all pixels in one column. This column circuit can be selectively connected to a pixel in the corresponding column, and it is configured to be able to detect if the difference between Vpr and Vpr_last exceeds a predefined threshold (which means an event has happened in the currently selected pixel). The column circuit may also be able to operate the switch between the photoreceptor output and the storage capacitor. Optionally the column circuit can contain an analog-to-digital converter (ADC) to convert Vpr to a digital number.

The vision sensor of FIG. 3a further comprises a circuit 202 for selecting one or multiple rows (called row selection circuit), where selection means selectively connect the pixels in this row to the corresponding column circuit; and a circuit 203 for transmitting the addresses of those pixels where the difference between Vpr and Vpr_last exceeds a predefined threshold (and optionally the digital number representing Vpr) to some kind of receiver which can be external to the sensor chip. This circuit for transmitting data shall be called data readout circuit.

The vision sensor of FIG. 3a further comprises a finite state machine (FSM) 301 for controlling the sensor; and a first-in-first-out (FIFO) memory buffer 302 for a more efficient readout of the addressed events.

The FSM controls the readout and the writing of the addresses into the FIFO, while the receiver can read the addresses from the FIFO at its own pace.

To improve readout speed, the pixel array could be split into a lower and upper half with separate column and readout circuits, which allows reading two rows in parallel and thus allows operating the sensor at twice the frame rate.

Pixel Circuit

Figure 4:
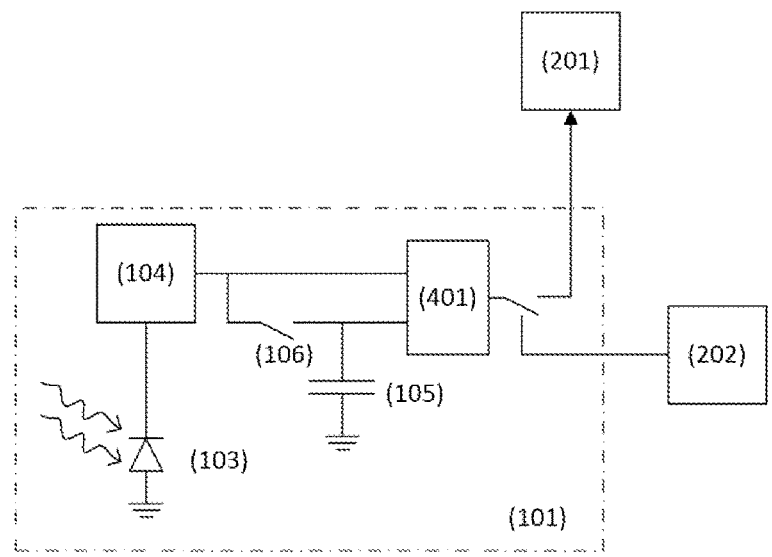

Referring to FIG. 4, there is illustrated an exemplary configuration for a pixel 101 provided in any of the vision sensor embodiments; preferably each pixel 101 provided in the vision sensor of will be configured as is illustrated in FIG. 4.

The pixel 101 may comprise, a photodiode 103 to convert light into a current Iphoto that is proportional to the light intensity; a photoreceptor circuit 104 that converts said current into a voltage Vpr (for example with a linear or logarithmic relation between Iphoto and Vpr); a storage capacitor 105 to store a past value of Vpr called Vpr_last; at least a first switch 106 that allows setting the voltage on capacitor 105 to the current photoreceptor output voltage Vpr.

The pixel 101 comprises a circuit 401 that allows to selectively connect the pixel to the circuit that determines if the difference between Vpr and Vpr_last exceeds a threshold. This circuit 401 is called PRO and allows reading out the voltages Vpr and Vpr_last. PRO can be either reading both quantities in parallel or sequentially. PRO is enabled by a RowSelect signal coming from the row selection circuit. If PRO is enabled, the output of PRO is connected to the input of the column circuit. PRO may contain a buffer to read out Vpr and Vpr_last without affecting the voltages themselves. The buffer provides an electrical impedance transformation.

In the present description the ensemble of photodiode and photoreceptor shall be called pixel front-end; the ensemble of storage capacitor 105, the reset circuit and PRO 401 shall be called pixel back-end.

Each pixel stores a voltage representing the illumination at the time of the last event emitted at this pixel, the illumination at the time of the last event shall be called illum_last. This representation is stored on a capacitor 105.

The operable electronical connections (switches) used in the circuit may be implemented with a multitude of circuits: simple CMOS gates, full transmission gates or buffered, directed connections that establish an electronical connection without sharing charges.

Alternative Pixel Circuit with Global Shutter

Figure 5:
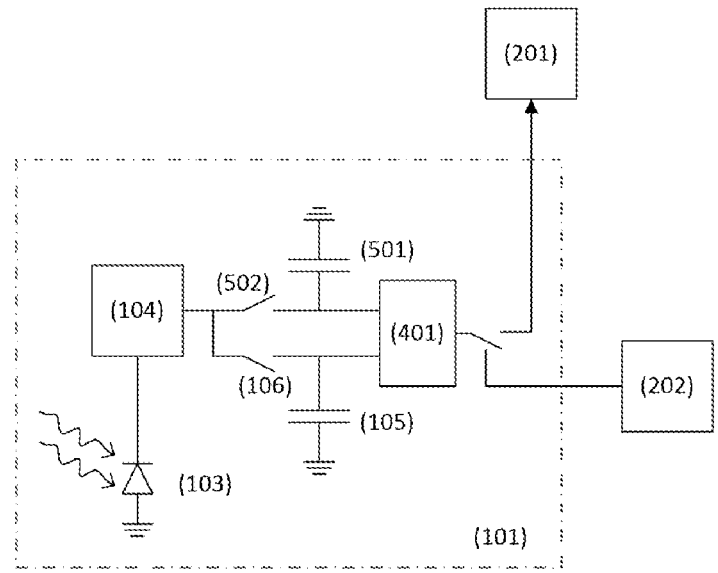

Referring to FIG. 5, there is illustrated an exemplary configuration for a pixel 101 provided in any of vision sensors embodiments. Preferably each pixel 101 provided in the vision sensor of will have configured illustrated in FIG. 5.

The pixel 101 comprises,
a photodiode 103 to convert light into a current Iphoto that is proportional to the light intensity;
a photoreceptor circuit 104 that converts said current into a voltage Vpr (for example with a linear or logarithmic relation between Iphoto and Vpr),
a storage capacitor 105 to store a past value of Vpr called Vpr_last,
at least a first switch 106 that allows setting the voltage on capacitor 105 to the current photoreceptor output voltage Vpr, a circuit 401 that allows to selectively connect the pixel to the circuit that determines if the difference between Vpr and Vpr_last exceeds a threshold,
a second storage capacitor 501 and
at least a second switch 502 that allows to electronically connect the output of the photoreceptor 104 to the second storage capacitor 501. This second switch 502 is operated simultaneously for all pixels The circuit 401 is called PRO and allows to read out the voltages Vpr and Vpr_last. PRO can be either reading both quantities in parallel or sequentially. PRO is enabled by a RowSelect signal coming from the row selection circuit. If PRO is enabled, the output of PRO is connected to the input of the column circuit. PRO may contain a buffer to read out Vpr and Vpr_last without affecting the voltages themselves. The buffer provides an electrical impedance transformation.

To avoid motion artefacts caused by changes in the scene between comparison of Vpr and Vpr_last of one pixel and the next pixel, it can be beneficial to simultaneously sample Vpr for all pixels before sequentially comparing Vpr to Vpr_last. To do simultaneous sampling for all pixels, an additional, second storage capacitor 501, another switch 502 and a global signal to control the switch 502 are needed.

The additional switch 502 is used to sample Vpr for all pixels simultaneously on their corresponding second storage capacitor 501. The voltage on the second storage capacitor 501 then represents the illumination at the time of sampling.

PRO 401 is configured to read either the voltage stored on the first storage capacitor 105 or the voltage on the second storage capacitor 501.

In an embodiment of the vision sensor as shown in FIG. 3a, the additional switch 502 is controlled by the FSM 301.

Pixel Sub-Blocks:

Photoreceptor:

It should be understood that the photoreceptor provided in each pixel of the pixel array of the vision sensor of FIG. 1a, may take any suitable configuration. FIGS. 6 to 10 provide exemplary implementations of the photoreceptor in each pixel.

The pixel may use a logarithmic photoreceptor to allow for high dynamic range and sensitivity to temporal contrast instead of temporal difference. If a negative feedback circuit is employed, a fast response to illumination changes can be achieved.

Figure 6:
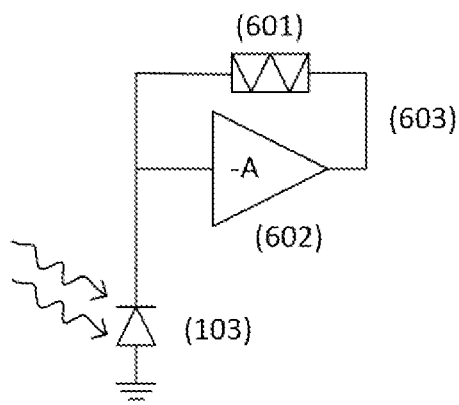
FIGS. 6 to 10 show different implementation of pixel front-end circuits.

A basic logarithmic photoreceptor with feedback, illustrated in FIG. 6, consists of a photodiode 103, an inverting amplifier 602 and a circuit element with logarithmic current-to-voltage relation 601 that is connected between the input and the output of the inverting amplifier. The inverting amplifier ensures that the voltage over the photodiode remains almost constant. The output of the photoreceptor 603 is given by the output of the inverting amplifier.

Figure 7:
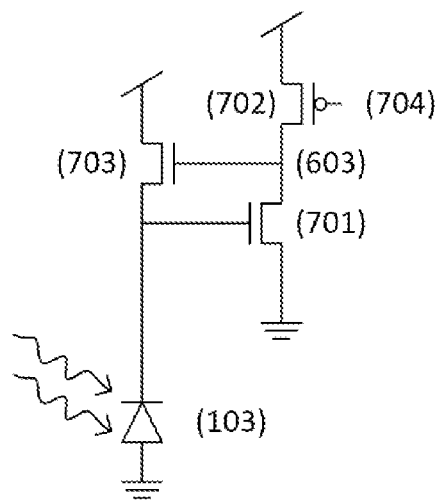

In the preferred photoreceptor with feedback implementation, illustrated in FIG. 7, the inverting amplifier is formed by an NMOS transistor 701 and a PMOS transistor 702. The source of the NMOS 701 is connected to ground, the gate is connected to the photodiode 103 and the drain is connected to the drain of the PMOS 702, forming the output of the inverting amplifier 603. The source of the PMOS 702 is connected to the power supply, and the gate is connected to a constant bias voltage 704. A second NMOS feedback transistor 703 is used for the logarithmic current-to-voltage conversion, the source of the second NMOS transistor 703 is connected to the photodiode, the gate is connected to the output of the inverting amplifier 603 and the drain is connected to the power supply.

Figure 8:
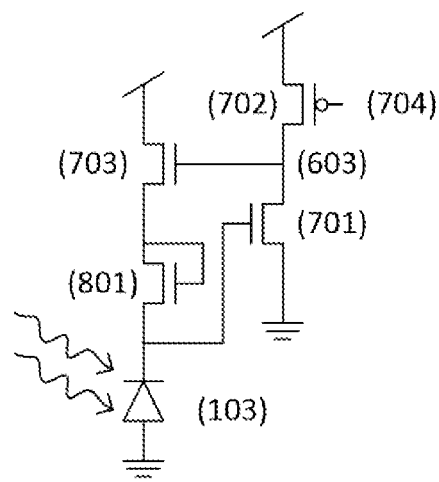

Alternative Logarithmic Photoreceptor with Feedback with More Conversion Gain:

Referring to FIG. 8 there is illustrated a logarithmic pixel front-end with increased gain compared to the pixel front-end illustrated in FIG. 7. To increase the pixel gain (higher change of the photoreceptor output voltage Vpr for a given light intensity change) an additional NMOS transistor 801 is added to the photoreceptor in between the photodiode 103 and the source of the feedback transistor 703.

Figure 9:
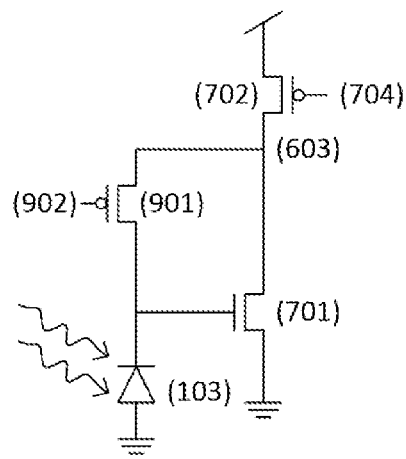

Alternative Logarithmic Photoreceptor with Feedback with PMOS Feedback Transistor:

An alternative implementation of the photoreceptor, illustrated in FIG. 9 uses a PMOS transistor 901 instead of an NMOS transistor as feedback element. The drain of the PMOS transistor 901 is connected to the photodiode 103, the gate is connected to a bias voltage 902 and the source is connected to the output of the inverting amplifier 603. This improves the speed of the response as well as the noise performance. The speed of the response is improved because there is less parasitic capacitance between the photodiode voltage and the output of the photoreceptor. The noise performance is improved because PMOS transistors tend to have lower flicker noise than NMOS transistors.

Implementation of Logarithmic Front-End without Feedback:

To further reduce the size of the pixel, it is possible to use a photoreceptor without feedback circuit. Then the photoreceptor consists of a photodiode and one transistor. The transistor used can be either an NMOS or a PMOS.

Figure 10:
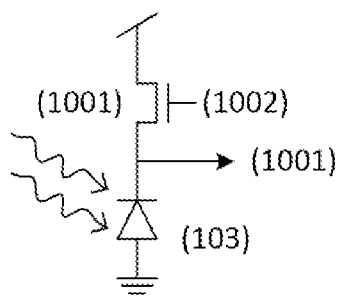

Illustrated in FIG. 10 is a photoreceptor with NMOS transistor 1001, where the drain of the transistor is connected to the power supply, the gate is connected to a bias voltage 1002 and the source, which is the output 1001 of the photoreceptor, is connected to the photodiode 103. Using an NMOS transistor in this photoreceptor, it is possible to have a complete pixel without PMOS transistor, which allows more compact layout.

The disadvantage of an implementation without feedback is that the pixel response to a light intensity change is slower because the voltage swing over the photodiode capacitance is bigger.

Figure 11:
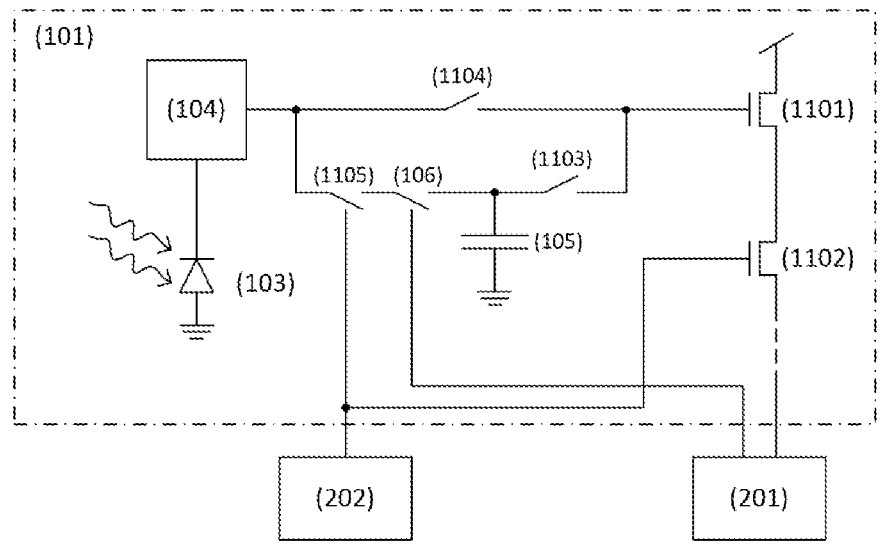
FIG. 11 shows a pixel circuit with more details about the pixel back-end implementation with respect to FIG. 4.
Figure 12:
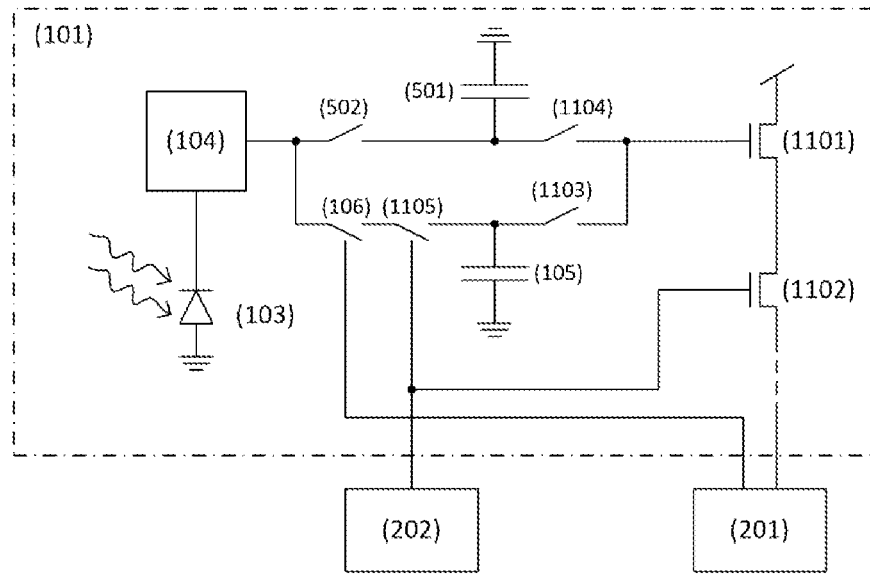
FIG. 12 shows a pixel circuit with more details about the pixel back-end implementation with respect to FIG. 5.
Figure 13:
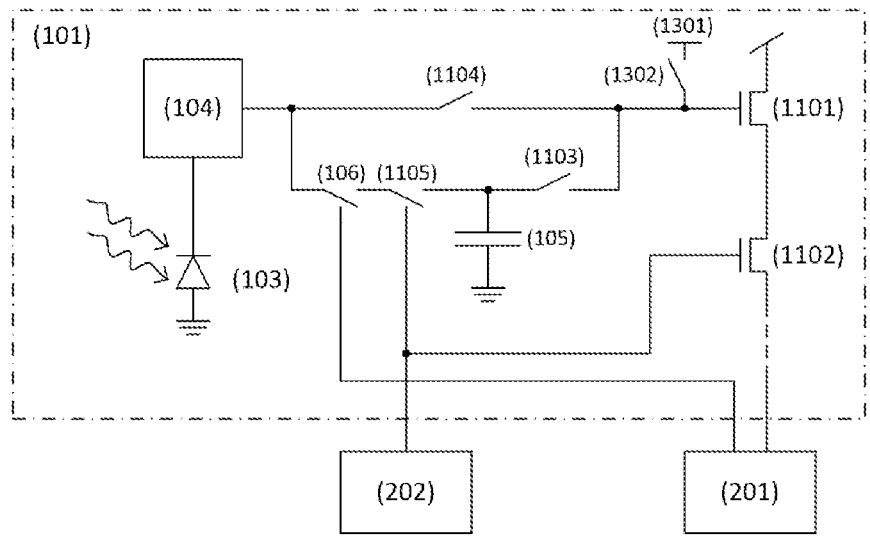
FIG. 13 shows an alternative pixel circuit with more details about the pixel back-end implementation with respect to FIG. 4.

Preferred Pixel Back-End Implementation:

It should be understood that the pixel back-end provided in each pixel of the pixel array of the vision sensor of FIG. 1a, 2a or 3a, may take any suitable configuration. FIGS. 11 to 13 provide exemplary implementations of each pixel for the embodiment of the vision sensor illustrated in FIG. 2a.

Referring to FIG. 11, the implementation of the pixel includes an output buffer in the form of a source follower NMOS transistor 1101 and corresponding switch (implemented as NMOS transistor) 1102, a storage capacitor 105, which may be (implemented likely as a Moscap, and four switches 106, 1103, 1104 and 1105. The two switches 1105 and 106 in series, one controlled by the row selection circuit 202 and the other one the column circuit 201, allow to set the voltage on the storage capacitor 105 to the output voltage of the photoreceptor 104. This series of two switches ensures that not only a pixel where the corresponding row select signal is active, can be reset (which means setting the voltage on the storage capacitor 105 to the output of the photoreceptor) by a column circuit.

For the column circuit 201 to determine if the difference between Vpr and Vpr_last exceeds a predefined threshold, the row select circuit 202 closes switch 1102 and 1105, and then the switch 1104 is closed while switch 1103 is open. This allows the column circuit to read the output of the photoreceptor. Then switch 1104 is opened and switch 1103 is closed and the column circuit can read the voltage stored on the capacitor 105. When the column circuit has read both voltages, it determines if the difference between Vpr and Vpr_last exceeds a predefined threshold, and if it does, the column circuit can close switch 106 to set the voltage on the capacitor 105 to the voltage of the photoreceptor output.

It is preferably to have the storage capacitor 105 much larger than the parasitic capacitor of the source follower input transistor Msf 1101.

Pixel Implementation with 'Global Shutter':

To avoid motion artefacts caused by changes in the scene during the scanning of one frame, for some applications it can be beneficial to globally sample the photoreceptor output voltage Vpr for each pixel at the same instant. In FIG. 12 is illustrated a pixel that allows globally sampling Vpr. Compared to the pixel illustrated in FIG. 11, this pixel contains a second storage capacitor C2 501 and a further switch 502. The further switch is placed between C2 and the photoreceptor circuit 104 and it is controlled by a global signal called Sample_now. Preferably this further switch 502 is operated in all pixels simultaneously.

Pixel with Additional Switch to Reduce the Effect of Charge-Sharing:

When the voltage stored on the storage capacitor 105 is read out using the source follower input transistor Msf 1101 an effect called charge sharing can affect the result. Whatever charge stored on Msf before connecting the storage capacitor 105 will influence the resulting voltage on the gate of Msf.

If it is necessary to minimize the effect of charge sharing, it is beneficial to reset the parasitic capacitor of Msf 1101 to a known reference voltage before selecting one of the storage capacitors. Referring to FIG. 13, this can be done by adding an additional switch 1302 that allows to connect the gate of Msf to a voltage source 1301. The additional switch 1302 is closed for a short time, and then reopened before Msf is connected to the storage capacitor 105 by closing switch 1103.

Figure 14:
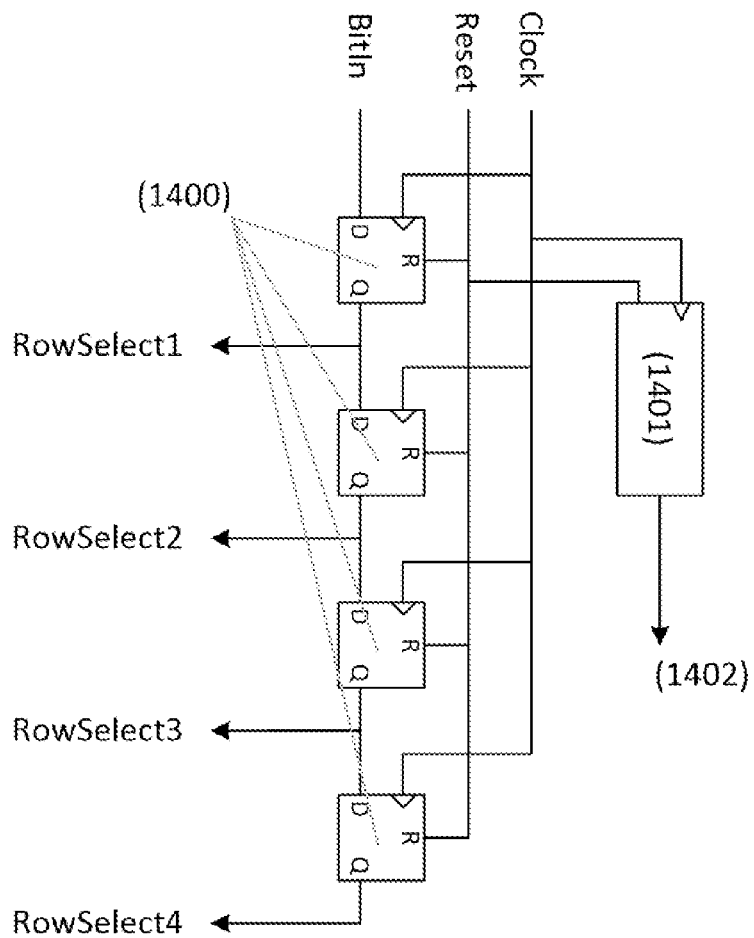
FIG. 14 shows the implementation of a row selection circuit.

Row Selection Circuit:

It should be understood that the row selection circuit 202 of the vision sensor of FIG. 2a or 3a, may take any suitable configuration. FIG. 14 illustrates an example implementation of a row selection circuit. The row selection circuit selectively connects a row of pixels to the corresponding column circuit 201 by means of a set of RowSelect signals. The output of the row selection circuit is a set of RowSelect signals, one for each row of pixels. Selecting a row means the the RowSelect signal for this row is active, while the RowSelect signals for all other rows are inactive. The row selection circuit may consist of a set of Flip-Flops 1400 connected in series to form a shift-register scan circuit.

The row selection circuit has a clock input which allows moving from one row to the next row, which means the currently active RowSelect signals is changes to inactive, while the next RowSelect signal changes its state to active.

The row selection circuit contains a circuit 1401 that encodes the address 1402 of the currently selected row and outputs this address to the data readout circuit 203.

The row selection circuit may contain the possibility to be configured in a way to skip rows during scanning. This feature is used to implement a so-called region-of-interest (ROI) readout.

In an embodiment of the vision sensor such as shown in FIG. 3a, the control signals for the shift register (BitIn, Reset and Clock) may be controlled by the FSM 301.

Figure 15:
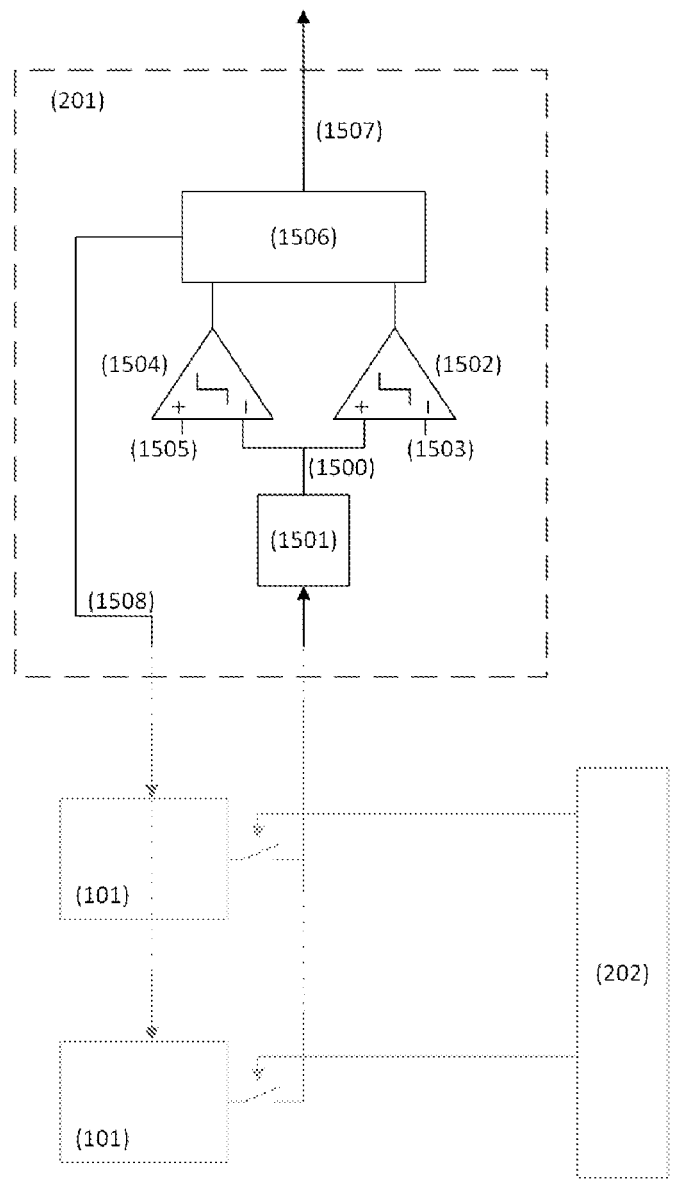
FIG. 15 shows the implementation of a column circuit and how it is connected to the pixels.

Column Circuit:

Referring to FIG. 15 there is show a possible implementation for the column circuit which can be used in any of the vision sensor embodiments. The column circuit comprises, a switched capacitor circuit SC 1501 which allows taking the difference between Vpr and Vpr_last of the currently selected pixel 101 in this column. The circuit SC may amplify this difference creating a voltage Vdiff 1500;

a first comparator CP1 1502 with the first input connected to a first threshold voltage 1503 and the second input connected to Vdiff 1500 and a second comparator CP2 1504 with the first input connected to Vdiff 1500 and the second input connected to a second threshold voltage 1505;

a logic circuit LC 1506: Based on the outputs of the comparators CP1 1502 and CP2 1504, an event is considered to have occurred if one of the comparator outputs indicates that the difference between the photoreceptor 104 output voltage and the voltage stored on the capacitor 105 is larger than one of the thresholds. In the case of an event, LC activates the switch 106 by means of a reset signal 1508, and actives the 'event' output signal 1507.

Optionally an ADC may be provided in the column circuit to convert the photoreceptor 104 output Vpr of the currently selected pixel to a digital number.

Figure 16:
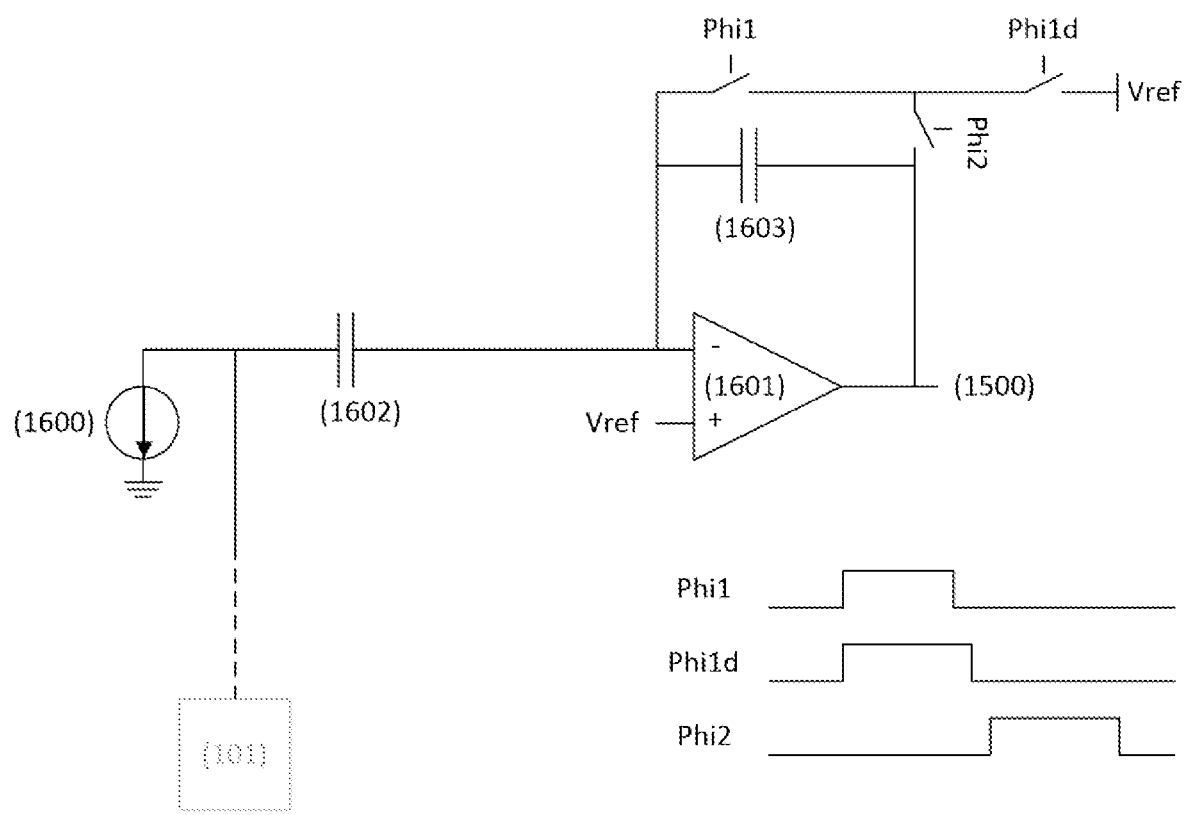
FIG. 16 shows the implementation of an SC circuit, which is part of the column circuit.

Switched Capacitor Circuit SC:

Referring to FIG. 16, there is illustrated an SC circuit 1501 based on a correlated double sampling (CDS) circuit such as is used in image sensors. CDS circuits are well known.

The SC circuit consists of a current source 1600 that is connected to the PRO 401 circuit in the pixel 101, an amplifier 1601, two capacitors CS1 1602 and CS2 1603 and three switches which controlled by the signal Phi1, Phi1d and Phi2.

With this implementation, the difference 1500 between Vpr and Vpr_last is amplified by the capacitor ratio $$\frac{CS1}{CS2}.$$

While the pixel is configured to output Vpr, Phi1 and Phi1d are active and the corresponding switches are closed, while Phi2 is inactive and the corresponding switch open. Then Phi1 is made inactive and the corresponding switch is opened. Afterwards Phi1d is made inactive and the corresponding switch is opened. Then Phi2 is activated and the corresponding switch is closed. Then the pixel is configured to output Vpr_last. After a settling time, the output 1500 of the circuit will correspond to the amplified difference between Vpr and Vpr_last.

In an embodiment of the vision sensor such as shown in FIG. 3a, the waveforms of Phi1, Phi1d and Phi2 (shown in the lower left part of FIG. 16) may be controlled by the FSM 301.

Figure 17:
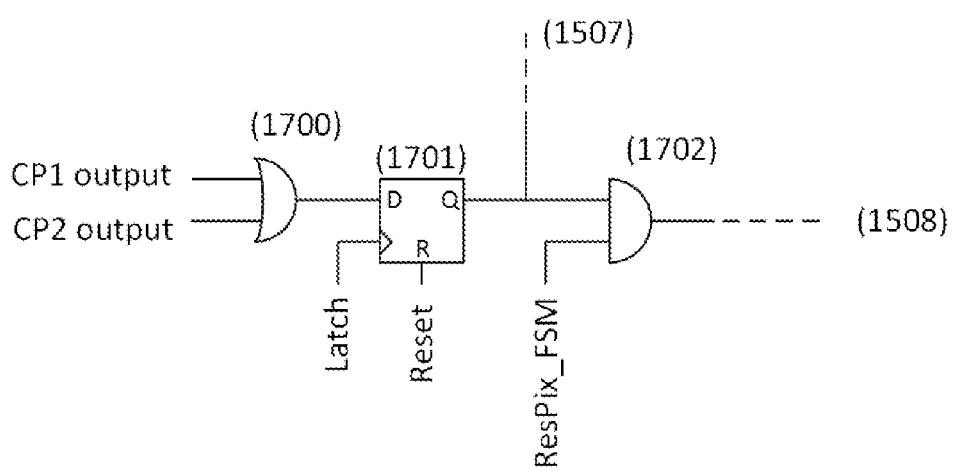
FIG. 17 shows a first implementation of an LC circuit, which is part of the column circuit.

Logic Circuit LC Implementation:

A basic implementation of the LC circuit 1506, as illustrated in FIG. 17 consists of an OR-gate 1700 to combine the outputs of the two comparators CP1 1502 and CP2 1504. The output of the OR is high if one of the comparators signals that the difference between Vpr and Vpr_last is bigger than the corresponding threshold. The output of the OR gate is stored in a Flip-Flop 1701 at the rising edge of a Latch signal. The Flip-Flop may be reset with a signal called Reset. The output of the Flip-Flop indicates an event 1507 and goes to the data readout circuit 203, and it is also ANDed 1702 with a control signal ResPix_FSM to generate the pixel reset signal 1508 which goes to the pixels in this column and controls the first switch 106.

In an embodiment of the vision sensor such as shown in FIG. 3a, the waveforms of the control signal Latch, Reset and ResPix_FSM may be controlled by the FSM 301.

Figure 18:
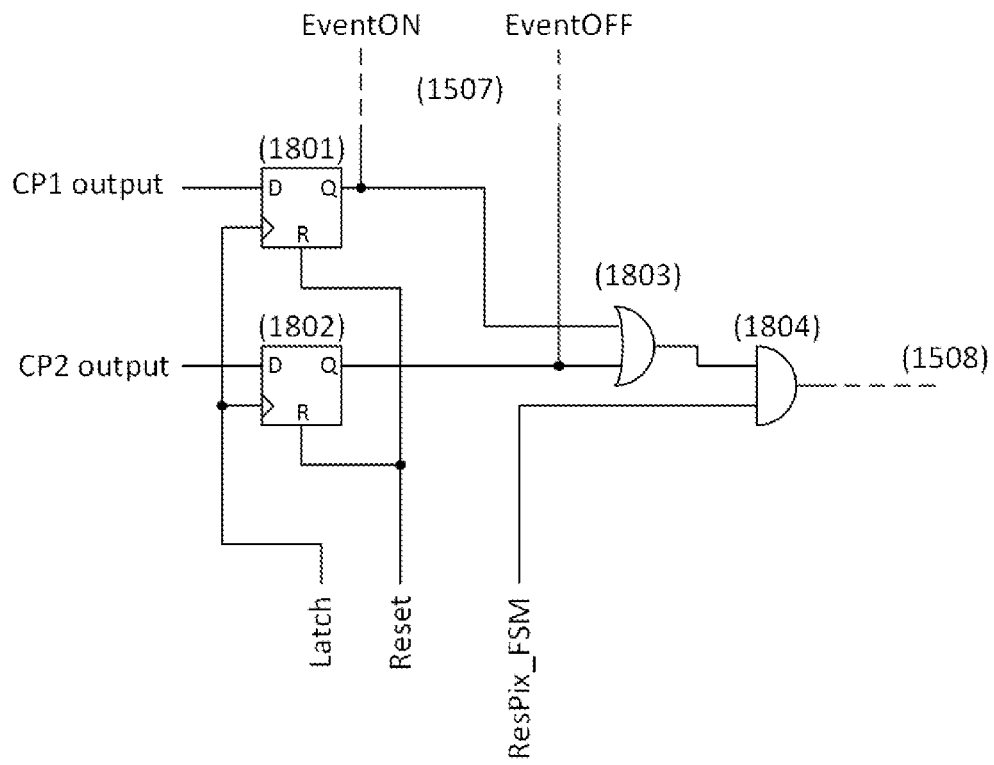
FIG. 18 shows a second implementation of an LC circuit, which is part of the column circuit.

Logic Circuit LC Implementation with Polarity Output:

If it is desired that the sensor outputs the polarity of the illumination changes (whether the light intensity increased or decreased), the LC circuit illustrated in FIG. 18 may be used. The circuit consists of two Flip-Flops 1801, 1802 to store the outputs of the comparators CP1 1502 and CP2 1504 on the rising edge of a latch signal. The outputs of the Flip-Flops define the output 1507 of this LC circuit implementation, which thus consists of two signals going to the data readout circuit 203. One of these signals (EventOn) indicates increasing light intensity, the other one (EventOff) indicates decreasing light intensity. There is an OR-gate 1803 with its inputs connected to the outputs of the Flip-Flop and its output connected to an AND-gate 1804. The second input of the AND-gate is a global control signal ResPix_FSM. The output 1508 of the AND-gate controls the first switch 106 in the pixels of the corresponding column.

Figure 19:
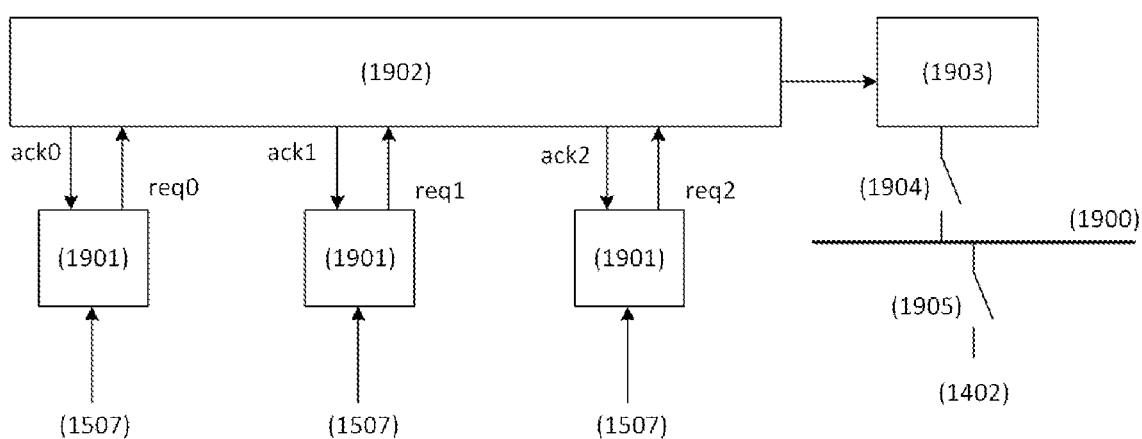
FIG. 19 shows the implementation of a data readout circuit.
Figure 20:
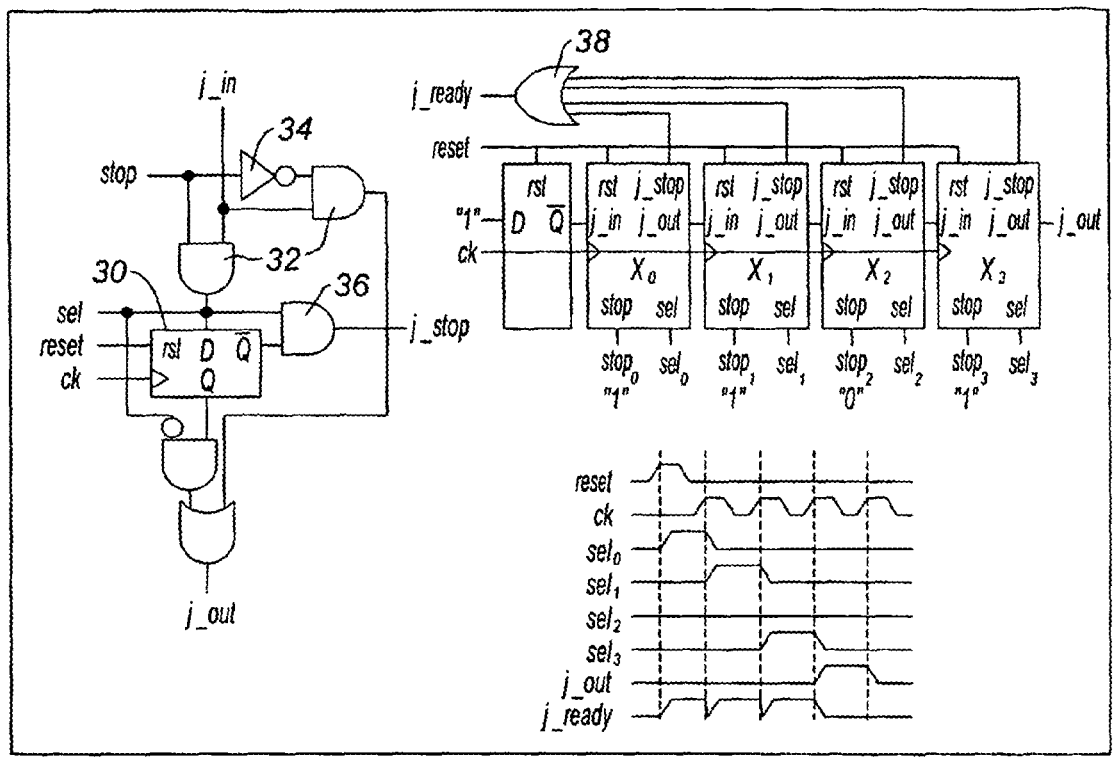
FIG. 20 shows a token-based data readout circuit.

Data Readout Circuit:

It should be understood that the data readout circuit 203 provided in the vision sensor of FIG. 2a or 3a, may take any suitable configuration. FIGS. 19 and 20 provide exemplary implementations of a data readout circuit for the embodiment of the vision sensor illustrated in FIG. 2a or 3a.

The data readout circuit allows reading out the addresses of those pixels where an event has happened. For this, row after row, the address of the corresponding row is output, as well as the addresses of all the columns where an event is latched.

As illustrated in FIG. 19, a data readout circuit may comprise a communication bus 1900; a column address encoder circuit 1903 that encodes the column address; a switch 1904 that allows to connects the encoder circuit 1903 to the communication bus; a switch 1905 that allows to connects the row address 1402 to the communication bus.

The data read out circuit further comprises, for each column circuit 201 an arbitration logic circuit (hereinafter referred as arblogic circuit) 1901 that, in case of an event 1507 in this column, by means of a request signal requests to the arbitration circuit 1902 for transmitting its address on the communication bus. Once it has transmitted the address, this circuit will disable its request signal. An arbitration circuit 1902 that arbitrates between all the arblogic circuits 1901 wanting to transmit an event.

To transmit all the events in a row of pixels, first the row address 1402 is connected to the communication bus 1900 by means of switch 1905. Once the row address has been transmitted, the column address encoder 1903 is connected to the communication bus 1900 by means of switch 1904. Now all the active event bits (outputs 1507 of the column circuits 201) are stored in the arblogic circuits 1901. The arblogic circuits with active event bits request to the arbitration circuit 1902 for access to the communication bus. The arbitration circuit sequentially grants access to all requesting arblogic circuits by means of an acknowledge signal, until no more arblogic circuit are requesting and all event column addresses have been transmitted.

Then event transmission for the next row can start.

Like the row selection circuit, the arbitration circuit may contain the possibility to skip columns to allow for ROI readout.

Token-Based Readout Circuit:

An alternative implementation of the data readout circuit may be a token-readout circuit, such as illustrated in FIG. 20.

The token-readout is a circuit for the reading of the active event bits in an assembly of column circuits connected to a communication bus, for the transmission of this information via the communication bus, comprising means for reading the values contained in at least a part of the column circuits of this assembly having a value to transmit, and an arbitration circuit for the successive transmission of the values read via the communication bus, characterized in that the arbitration circuit comprises at least one plurality of processing blocks X0, X1, X2, X3 allocated respectively to each of the said column circuits, and in that the processing blocks X0, X1, X2, X3 of each of the said pluralities of processing blocks are arranged such that, in the course of a transmission of the said values, they transfer from one block to the following block of this plurality a unique authorization signal for the transmission of the read value, the said authorization signal being capable, when passing from one processing block to the following block, of detecting those among the said column circuits associated with the said plurality of processing blocks which have an item of information (event) to transmit and of causing, where applicable, the successive transmission of the said information to the said communication bus.

As shown on the left side of the FIG. 20, a j_in signal indicating according to its value 1 or 0, the availability or unavailability of the token for a given processing block, is switched either to bypass a corresponding D flip-flop 30, and send the input j_in directly to the output j_out of the D flip-flop 30 using logic gates 32 and an inverter 34, depending on the value 1 or 0 of a stop signal, depending on whether the column circuit has a value to be transmitted.

When j_in signal is 1, this token to the input of the D flip-flop 30 is stored in the D flip-flop at the rising edge of a clock signal CK is also supplied to the latch D. The entry of the D flip-flop may also be used as the corresponding pixel selection signal. Thus, a selection signal sel is directly connected to the input of the D flip-flop 30.

The sel and the output signal Q of the D flip-flop 30 are input to an AND gate 36 which outputs a signal j_stop. This j_stop signal goes to 1 when the token is present at the input of the D flip-flop and returns to 0 when the chip was sampled, that is to say updated in the D flip-flop memory 30.

The right part of the FIG. 20 illustrates how a shift register, wherein the token is propagated, can be achieved by the cascading of blocks X0 to X3 such as that shown in the left part of this same FIG. 20.

The block X0 has its input j_in connected to the Q output of a D flip-flop used to inject the token in the shift register.

To initialize the shift register, a reset signal 1 is transmitted to a corresponding input of each D flip-flop of the shift register, so that they may be reset and a token to be placed at the input of the first D flip-flop.

In the example shown in FIG. 20, the column circuits corresponding respectively to the blocks X0, X1 and X3 have a value to be transmitted (corresponding signals stop0, stop1, and stop3 are 1). The column circut corresponding to X2 has nothing to transmit (stop2 is 0).

When a token is placed at the input of block X0, since the stop0 signal is 1, the sel0 signal goes to 1. At the first rising edge of the clock signal ck sent to all the D flip-flops of the shift register, the corresponding pixel in block X0 sends its value via the communication bus and sel0 signal goes to 0 and passing the token at the entrance of the block X1. Sel1 signal then goes to 1 as stop1 is 1. In the next rising edge of the clock signal ck, the pixel corresponding to the block X1 transmits its value via the communication bus and sel1 signal goes to 0 and passing the token directly to the input of the X3 block as the stop2 signal is 0. Sel3 signal then passes to 1. More generally, when the sel_i signal is 1, the communication bus is then available to the column circuit corresponding to the block Xi.

Control FSM:

As illustrated in FIG. 3a, an embodiment of the proposed vision sensor may include a finite state machine (FSM) 301 that controls the sensor. This means that the FSM will control the row selection circuit 202; control the column circuits 201 and also the data readout circuit 203. The FSM will control the writing of the event addresses to a FIFO 302 on the sensor chip. Specifically the FSM will control all the signals that operate the switches in the pixel and in the column circuits.

An FSM is a mathematical model of computation used to design both computer programs and sequential logic circuits. It is conceived as an abstract machine that can be in one of a finite number of states. The machine is in only one state at a time; the state it is in at any given time is called the current state. It can change from one state to another when initiated by a triggering event or condition; this is called a transition. A particular FSM is defined by a list of its states, and the triggering condition for each transition.

The implementation of an FSM is a set of registers and logic gates that implement the equations defined in the list of states and the triggering conditions.

Figure 21:
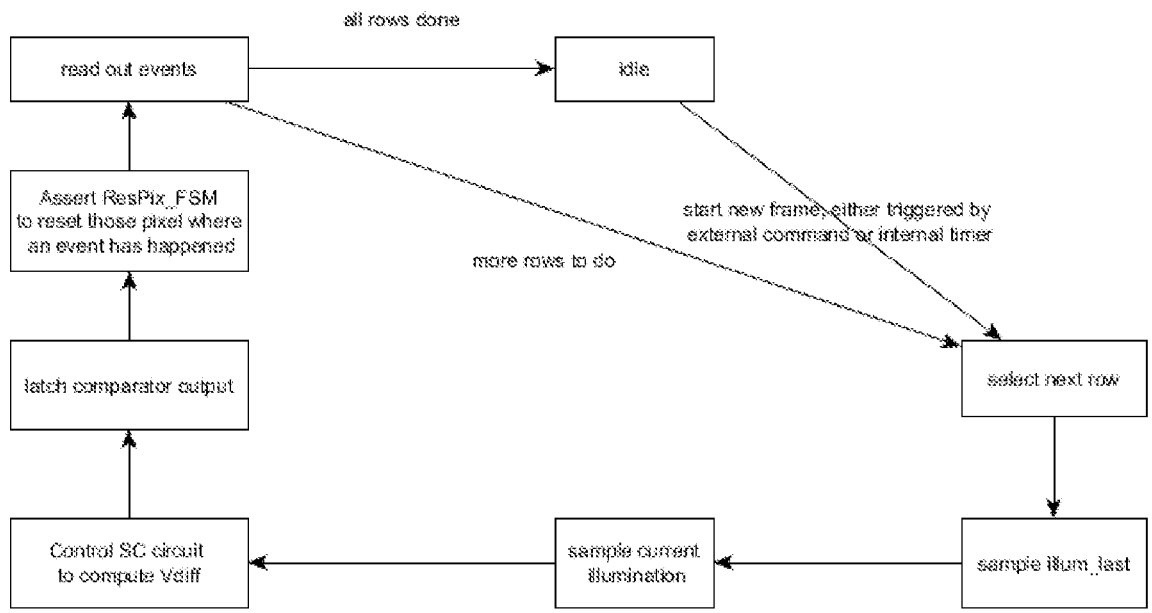
FIG. 21 shows the state transition diagram for a control state machine.

FIG. 21 shows in an abstract way the states and transitions of the control FSM that may be used in an embodiment of the proposed vision sensor.

Figure 22:
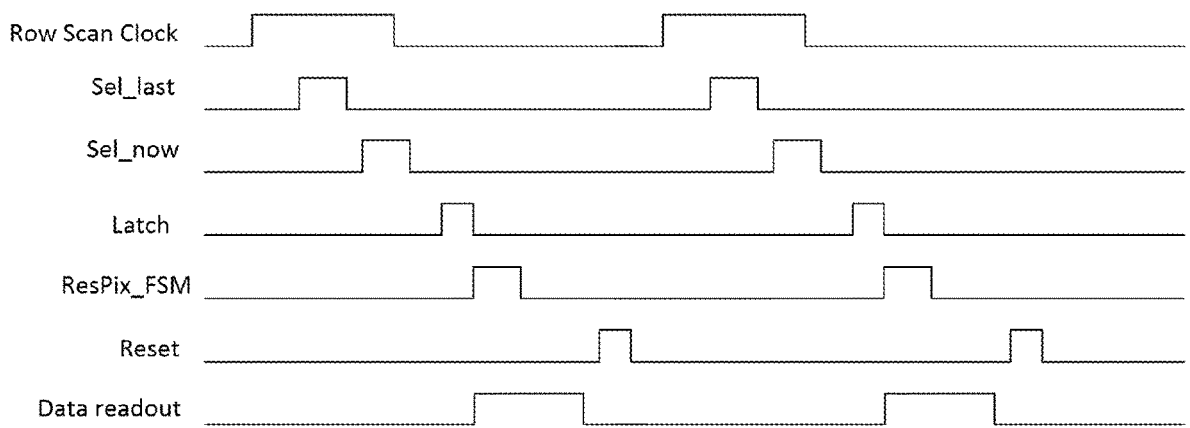
FIG. 22 shows the wave-forms of the control signals used to control the sensor.

Referring to FIG. 22 there is illustrated the timeline of the different signals coming from the control FSM. The signal Row Scan Clock controls the row selection circuit 202, Sel_last controls the switch 1103, Sel_now controls the switch 1104. The signals Latch, Reset and ResPix_FSM go to the LC circuit 1506, and the signal Data readout enables the data readout circuit 203.

Sampling and comparing the pixel voltages and event bit readout can be pipelined, which means that while the voltages from the currently selected rows are sampled, the event bits from the last row are read out. It means the 'event' bits (output from the column circuits) have to be stored in the data readout circuit.

FIFO:

As illustrated in FIG. 3a, an embodiment of the proposed vision sensor may include a first-in-first-out (FIFO) memory buffer 302. A first-in-first-out (FIFO) memory buffer is a memory where the data is read out in exactly the same sequence as it has been written into the memory. This mean a data word that is written first is also read first when the receiver enables a memory read request.

FIFOs are commonly used in electronic circuits for buffering and flow control between hardware and software. In its hardware form, a FIFO primarily consists of a set of read and write pointers, storage and control logic. Storage may be static random access memory (SRAM), flip-flops, latches or any other suitable form of storage. For FIFOs of non-trivial size, a dual-port SRAM is usually used, where one port is dedicated to writing and the other to reading.

Sensor Concept and Operation:

The proposed sensor will be used in a machine vision context, meaning that the output of the sensor will go (directly or indirectly) to some kind of processor, where some kind of algorithm runs, for example to calculate the position and movement of the sensor system.

The proposed sensor does not output images like a conventional image sensor. The pixel value (meaning a value representing the light intensity of this pixel) may optionally be output to the processor; instead the addresses of those pixels where a change is detected are transmitted. To detect changes between now and a previous moment in time, each pixel stores a representation of the light intensity at this previous moment in time (called illum_last).

The sensor consists of an array of pixels, organized in rows and columns. To detect events, one row of pixels shall be selected and for each pixel in this row, voltages representing illum_last and the current illumination are transferred to peripheral circuits, where the difference between the voltages representing illum_last and the current illumination is computed. If the difference between these voltages exceeds a threshold, the address of this pixel (and optionally a value representing the current illumination) is output and illum_last is set to the current illumination for this pixel. If this process is finished for the currently selected row, this row is unselected, and the next row is selected. Like this the whole sensor is scanned. A single complete scan of the sensor shall be called a frame. The rate at which a complete frame is scanned is called the frame rate.

Reading of the pixel voltages representing illumination and comparing them against the thresholds as well as resetting the pixels in case of an event happen in a row-parallel way. This means all pixels in a row are selected by the row selection circuit, and connected to their corresponding column circuits. All the column circuits simultaneously compute the difference of the voltages and finally they do the comparison against the thresholds and the pixel reset.

The sequence can also be pipelined to achieve higher frame rate. Pipelined here means that while sampling and computing the difference for the pixels in a row happens, the addresses (and potentially the values) from the previous row are read out and the corresponding pixels are reset. The potential ADC conversion can be an additional pipeline step between sampling and readout.

Because this proposed sensor strongly reduces redundancy of the output data, the load of the processing stage is reduced. And because this sensor does not need to convert pixel level voltages with a multi-bit analog-to-digital converter (ADC) for each pixel and each frame, the amount of data to be transmitted is reduced. The sensor can thus run at a higher frame rate than a conventional image sensor at the same resolution and the same power budget. This also facilitates post processing because the movement between two frames is smaller and thus matching visual landmarks is easier.

Mathematical Formulation:

To better illustrate the sensor concept; in the following a few basic equations describing the sensor are given. The voltage representing the illumination at time t is given by $$Vpr(t)=f(Int(t)) \quad (4)$$

where Int(t) is the illumination at time t and f (.) is a function that depends on the implementation of the pixel photoreceptor circuit 104. The voltage is sampled at discrete times $$Vpr(tn)=f(Int(tn)) \quad (5)$$

$$tn=n*tframe \quad (6)$$

tn denotes the sampling time of the n-th frame, tframe is the inverse of the frame rate. In each frame, we compute the difference of the current Vpr and Vpr at the time of the last event, this time is called tl. The difference is called Vdiff, and it is potentially amplified by a factor A:

$$Vdiff(tn) = A*(Vpr(tn) - Vpr(tl)) = A*(f(Int(tn)) - f(Int(tl))) \quad (7)$$

$$Vdiff(tn) = A \int_{tl}^{tn} f'(Int(tn)) * \frac{dInt(t)}{dt} dt \quad (8)$$

This means that Vdiff is an integral over the derivative of the light intensity, meaning it accumulates changes in the light intensity. An event is generated if Vdiff is bigger than the threshold:

$$Vdiff(tn) > VthresOn \rightarrow EventOn=1,$$
$$Vdiff(tn) < VthresOn \rightarrow EventOn=0 \quad (9)$$

$$Vdiff(tn) < VthresOff \rightarrow EventOff=1,$$
$$Vdiff(tn) > VthresOff \rightarrow EventOff=0 \quad (10)$$

VthresOn is bigger than zero, VthresOff is smaller than zero. If EventOn or EventOff equals 1, the pixel is reset and Vpr(tn) is stored for comparison in future frames.

Example Equations for Logarithmic Photoreceptor:

As an example for better understanding, for the following equations it is assumed that the sensor stores a quantity that is proportional to the logarithm of the light intensity, because this is the preferred implementation.

A voltage encoding the light intensity is read at discretized times:

$$Vpr(tn) = k1 + k2 * \log(Int(tn)), \quad (11)$$

where k1 and k2 are constants. To decide if an event has happened, we compute the difference between Vpr(tn) and Vpr at the time of the last event t1:

$$Vdiff(tn) = A(Vpr(tn) - Vpr(tl)) = A*k2(\log(Int(tn)) - \log(Int(tl))) \quad (12)$$

$$Vdiff(tn) = A*k2*\log\frac{Int(tn)}{Int(tl)} \quad (13)$$

We see that for a logarithmic intensity encoding, the sensor reacts to relative changes in the intensity, which is useful because it means the sensor reacts to scene reflectance changes independent of the illumination level which is the reason for being the preferred embodiment. From equation (5), we see that $$Vdiff(tn) = A \int_{tl}^{tn} f'(Int(t)) * \frac{dInt(t)}{dt} dt = A \int_{tl}^{tn} k2 * \frac{1}{Int(t)} * \frac{dInt(t)}{dt} dt \quad (14)$$

Thus, Vdiff is the derivative of the light intensity normalized by the light intensity and then integrated between the time of the last event and now. If we solve the integral, we again have equation (9). Vdiff being bigger than a threshold VthresON means that $$\frac{Int(tn)}{Int(tl)} > \exp\left(\frac{VthresON}{A*k2}\right) = const \quad (15)$$

So, the sensor generates an event if there is a sufficient relative change in the light intensity. The equation for VthresOff is similar.

In the following, for the sake of illustrating the sensor concept in an even simpler way, we assume that the light intensity is changing with a constant derivative. This means that $$Int(tn) = Int(tl) + \frac{dInt}{dt} * (n-l) * tframe \quad (16)$$

$$Vdiff(tn) = A*k2*\log\frac{Int(tl) + (n-l)*tframe*\frac{dInt}{dt}}{Int(tl)} \quad (17)$$

An event is generated if the value of Vdiff(n) is bigger than VthresOn (for positive derivatives of the intensity).

$$\frac{Int(tl) + (n-l)*tframe*\frac{dInt}{dt}}{Int(tl)} > \exp\left(\frac{VthresON}{A*k2}\right) = const \quad (18)$$

The left side of equation (15) is monotonously increasing with increasing n at a rate given by $$\frac{dInt}{dt}.$$

This means for large derivatives of the intensity the threshold can be reached within few frames, while for small derivatives a larger number of frames is required to reach the threshold, the small changes from one frame to the next frame are accumulated until the threshold is reached.

The invention claimed is:

1. A vision sensor comprising,
an array of pixels comprising rows and columns of pixels, wherein each pixel has an address assigned thereto which represents the position of the pixel in the array, wherein each pixel in the array of pixels comprises, a photodiode which can receive light, and which can output current having an amplitude proportional to the intensity of the received light; a photoreceptor circuit which is electronically connected to the photodiode, and which is configured to convert current which it receives from the photodiode into a voltage; a first storage capacitor, and at least a first switch which is positioned between the first storage capacitor and an output of the photoreceptor circuit, wherein the first switch can be selectively closed to electronically connect the output of the photoreceptor circuit to the first storage capacitor, or selectively opened to electronically disconnect the output of the photoreceptor circuit from the first storage capacitor; and
a circuit which is configured so that it can be selectively electronically connected to a pixel in the array, and to determine if the difference between the voltage output from the photoreceptor circuit and the voltage across the first storage capacitor, which is the past value of light intensity, is greater than a predefined threshold voltage, and to output the address of the pixel to a receiver only if the difference between the voltage output from the photoreceptor circuit and the voltage across the first storage capacitor is greater than a predefined threshold voltage.

2. The vision sensor according to claim 1 wherein the circuit is further configured to, either output to the receiver the voltage output from the photoreceptor circuit, or, output to the receiver a digital value which is representative of the voltage output from the photoreceptor circuit.

3. The vision sensor according to claim 1, wherein said circuit comprises,
a plurality of column circuits, the number of column circuits corresponding to the number of columns of pixels in the array of pixels, wherein each column circuit is configured to determine if, in a pixel, the difference between the voltage output from the photoreceptor circuit and the voltage across the first storage capacitor of that pixel, is greater than the predefined threshold voltage;
a row selection circuit configured so that it can selectively connect all of the pixels in a row to a respective column circuit so that all of the pixels in the row are simultaneously connected to said plurality of column circuits, so that for each of the pixels in the row, the difference between the voltage output from the photoreceptor circuit and the voltage across the first storage capacitor of each of those pixels, can be simultaneously determined; and
a read-out circuit for transmitting the address of a pixel to the receiver if the difference between the voltage output from the photoreceptor circuit and the voltage across the first storage capacitor is greater than the predefined threshold voltage.

4. The vision sensor according to claim 3 wherein the read-out circuit is configured to consecutively transmit the addresses of the pixels in the row in which it was determined that difference between the voltage output from the photoreceptor circuit and the voltage across the first storage capacitor was greater than the predefined threshold voltage, to the receiver.

5. The vision sensor according to claim 3, wherein each row of pixels in the array has a respective row address assigned to it, and wherein an output of row-selection circuit is connected to the read-out circuit, wherein the row-selection circuit is configured to output to the read out circuit, the row address of the row if is determined that in at least one pixel of that row, the difference between the voltage output from the photoreceptor circuit and the voltage across the first storage capacitor of said pixel is greater than a predefined threshold voltage, so that the read out circuit can transmit the address of the pixel to the receiver,
and wherein each column of pixels in the array has a respective column address assigned to it,
wherein the read out circuit is further configured to identify the column address of a column in the array, if the column circuit corresponding to that column of pixels, determines that in at least one pixel in that column the difference between the voltage output from the photoreceptor circuit and the voltage across the first storage capacitor of said pixel is greater than a predefined threshold voltage, so that the read out circuit can transmit the address of the pixel to the receiver.

6. The vision sensor according to claim 3 wherein each column circuit further comprises,
means for determining the difference between the voltage across said capacitor of a pixel and the voltage output from the photoreceptor circuit of the pixel, and outputting a signal which is representative of the difference; and
a first comparator and second comparator, each of which is connected to said means for determining the difference, so that the first and second comparators each receive the signal which is representative of the difference;
wherein the first comparator is configured to compare the signal it receives to a first predefined threshold value and to close the first switch if the signal is larger than the first threshold, and the second comparator is configured to compare the signal it receives to a second predefined threshold value and to close the first switch if the signal is larger than a second threshold.

7. The vision sensor according to claim 1 wherein each pixel further comprises a buffer in the form of a source follower transistor.

8. The vision sensor according to claim 7 wherein at least one further switch is further provided between the first capacitor and a gate of the source follower transistor, and a further switch is provided between the output of the photoreceptor circuit and the gate of the source follower transistor.

9. The vision sensor according to claim 1 wherein each pixel in the array of pixels further comprises,
a second storage capacitor, and a switch which is positioned between the second storage capacitor and an output of the photoreceptor, wherein the switch can be selectively closed to electronically connect the output of the photoreceptor circuit to the second storage capacitor, or selectively opened to electronically disconnect the output of the photoreceptor circuit from the second storage capacitor.

10. The vision sensor according to claim 9 wherein each pixel further comprises a buffer in the form of a source follower transistor, and wherein at least one further switch is provided between the first capacitor and a gate of the source follower transistor, and at least one further switch is provided between the second storage capacitor and the gate of the source follower transistor.

11. A method of vision sensing using a vision sensor, the method comprising
    (a) selectively electronically connecting a circuit to a pixel in array,
    (b) determining if the difference between a voltage output from a photoreceptor circuit and the a voltage across a first storage capacitor in the pixel is greater than a predefined threshold voltage;
    (c) outputting the address of the pixel to a receiver, if the difference between the voltage output from the photoreceptor circuit and the voltage across the first storage capacitor, which is the past value of light intensity, is greater than the predefined threshold voltage.

12. A method according to claim 11 further comprising closing a first switch so that the output of the photoreceptor circuit is electronically connected to the first storage capacitor only if the difference between the voltage output from the photoreceptor circuit and the voltage across the first storage capacitor is greater than the predefined threshold voltage, so that the past value of the light intensity stored on the storage capacitor is updated with the new current value of light intensity.

13. The method according to claim 11, wherein said vision sensor comprises a plurality of column circuits the number of column circuits corresponding to the number of columns of pixels in the array of pixels, each column circuit being configured to determine if, in a pixel, the difference between the voltage output from the photoreceptor circuit and the voltage across the first storage capacitor of that pixel, is greater than the predefined threshold voltage;

wherein said vision sensor also comprises a read-out circuit for transmitting the address of a pixel to the receiver if the difference between the voltage output from the photoreceptor circuit and the voltage across the first storage capacitor is greater than the predefined threshold voltage, wherein the method comprises the steps of, connecting all of the pixels in a row to a respective column circuit so that all of the pixels in the row are simultaneously connected to said plurality of column circuits, simultaneously determining for each pixel in the row, the difference between the voltage output from the photoreceptor circuit and the voltage across the first storage capacitor of the pixel and consecutively transmitting the addresses of the pixels in the row in which it was determined that difference between the voltage output from the photoreceptor circuit and the voltage across the first storage capacitor was greater than the predefined threshold voltage, to the receiver.

14. The method of vision sensing according to claim 11 wherein step (c) further comprises outputting to the receiver, either the voltage output from the photoreceptor circuit, or, a digital value which is representative of the voltage output from the photoreceptor circuit.

* * * * *